United States Patent

Schlosser

[11] 4,043,705
[45] Aug. 23, 1977

[54] REACTOR JET PUMP PLUGS

[76] Inventor: Vernon I. Schlosser, 1009 N. 11th St., Clinton, Iowa 52732

[21] Appl. No.: 634,426

[22] Filed: Nov. 24, 1975

[51] Int. Cl.² .............................................. F04F 5/00
[52] U.S. Cl. ..................................... 417/151; 176/38; 176/65; 239/578; 251/299; 417/176; 417/313
[58] Field of Search .................. 417/313, 54, 55, 151, 417/160, 182; 176/38, 65; 239/569, 578; 251/299

[56] References Cited

U.S. PATENT DOCUMENTS

| 273,652 | 3/1883 | Wheeler | 417/182 X |
| 3,838,002 | 9/1974 | Gluntz et al. | 417/151 X |
| 3,927,860 | 12/1975 | Smith et al. | 251/299 |

Primary Examiner—William L. Freeh
Assistant Examiner—Edward Look
Attorney, Agent, or Firm—Johnson, Dienner, Emrich & Wagner

[57] ABSTRACT

The invention provides a tool for closing off the jet nozzles of jet pumps located in an almost inaccessible location inside the shell of a boiling water reactor. The tool suspended on a cord is lowered down through a narrow gap extending down along the major part of the shell of the reactor, a distance of approximately 30 feet. The tool is lowered onto a stationary projection—namely, a lug or ear—which provides a gauge point for height and lateral position and an anchorage for torque in a horizontal plane. With these two controls for the tool of the invention, a closure for the jet nozzle may be applied to each of the jet nozzles to close them off against outflow of the water contained in the shell of the reactor thereby avoiding the bleak alternative of taking the reactor completely out of service, which includes removing the fuel bundles and draining the shell.

10 Claims, 8 Drawing Figures

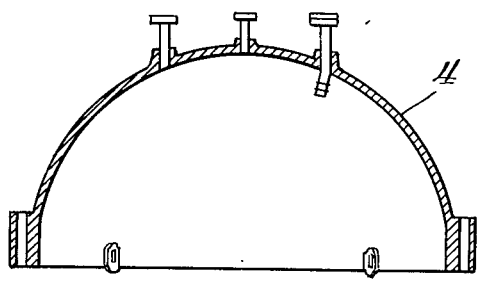
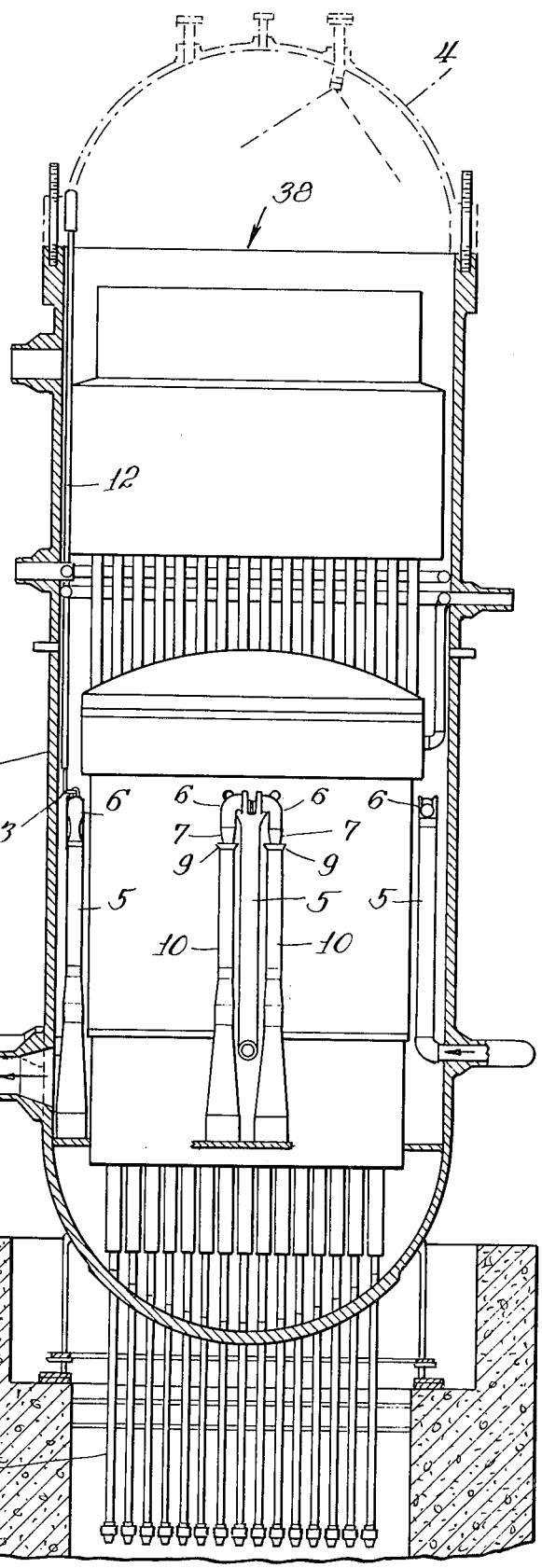

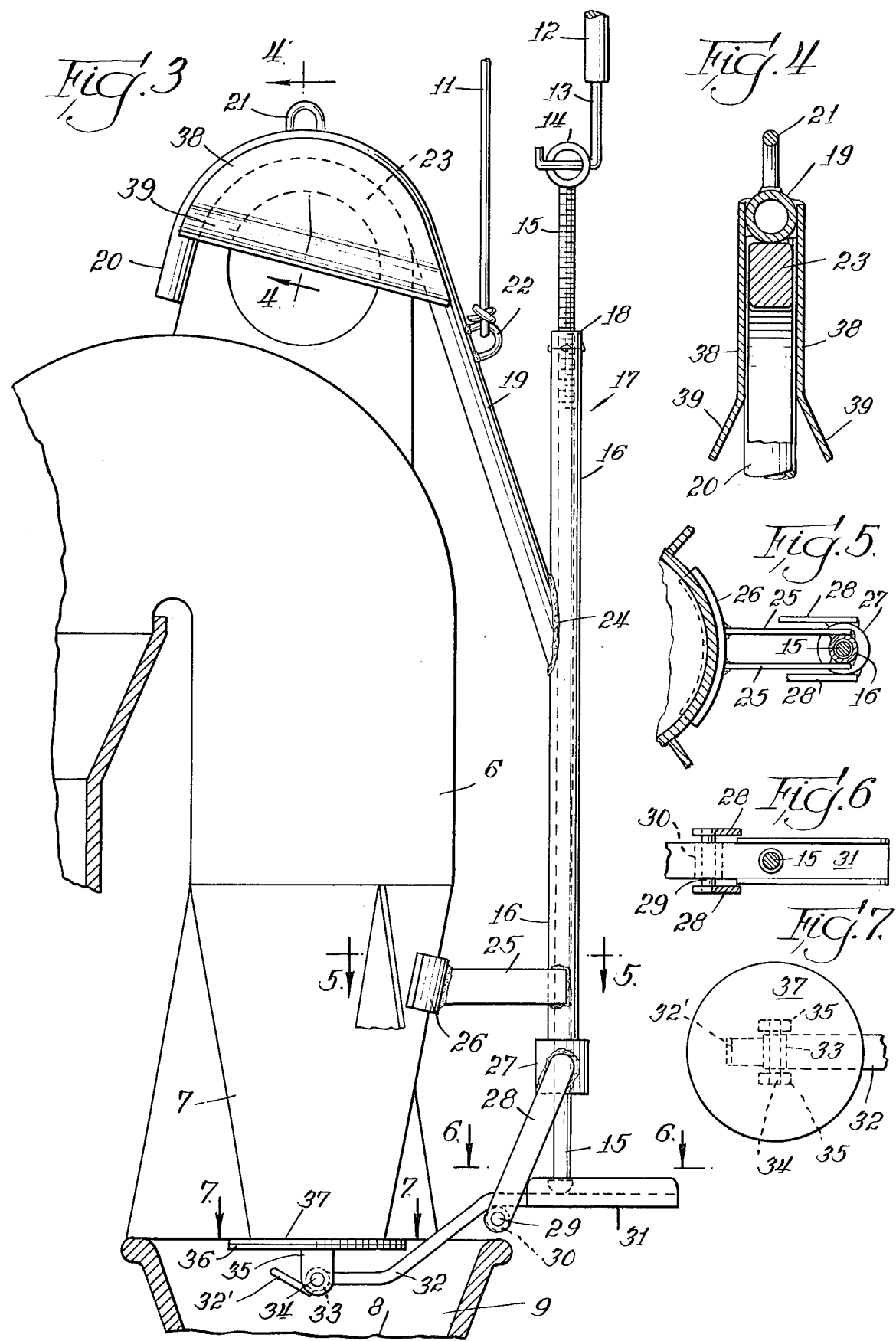

REACTOR JET PUMP PLUGS

BACKGROUND OF THE INVENTION

A nuclear reactor of the boiling water type employs a cylindrical shell in the lower part of which the reactor core is located. A continuous total circulation of cooling water internally of the reactor serving to remove heat from the reactor core is composed of the delivery of an external circulating pump to an array of jet pumps inside the shell, which jet pumps are energized by the flow delivered by the circulating pump to the jet pumps inside the shell. The jet pumps energized by the flow of water from the main circulating pumps induce a circulation through the core much greater in volume per unit of time than the flow delivered by the external circulating pump to the jet pumps.

The internal jet pumps, which are supplied internally of the shell with recirculating water by the external pumps, create internal circulation in the shell containing the reactor core. In other words, the external pumps activate the jet pumps whereby an internal or local circulation of much greater volume than that which passes through the external pumps flows in thermal contact with the reactor core in said shell.

The problem presented is that stopping the external circulation and opening the external circulation path of the recirculating pumps, which sometime become necessary, allows backward flow of the water contained in the shell out through the inlet of the contained jet pumps to the outside of the casing endangering the reactor. The tool of the present invention makes possible the closing off of the jet nozzles individually and prevents outflow of the contents of the shell, thereby avoiding the necessity for taking the reactor out of service and removing the fuel bundles.

BRIEF SUMMARY OF THE INVENTION

The invention provides a means for closing off the nozzles of the internally located jet recirculating pumps of a reactor. These jet pumps are located in a narrow annular space disposed some 30 feet down below the level at which there is room for the operator to stand. He is aided by an underwater television camera to check his introduction of the tool of the invention, and its correct emplacement of the disc of the tool into the throat of the pump and to see that the shrouded suspension hook of the tool is set down over the lug, or eye, at the top of the nozzle and to see that the tool is firmly locked into position closing off the jet pump nozzle to which it is attached. The tool which is suspended on a nylon cord has two guides, one is the guide of the hook, which is shrouded, over the eye of the jet nozzle, and the simultaneous entry of the closure into the mouth of the venturi of the jet pump, in the course of the operation of closing off the nozzle. He will also check to see that the application of the closure disc to the mouth of the jet nozzle is in correct position and that it shuts off the nozzle.

The tool which is suspended on the nylon cord has guiding actions to perform, and one is to lower the shrouded suspension hook down over the ear of the jet pump nozzle member. The other is to guide the closure disc edgewise down into the induction tube below the nozzle. These two engagements govern vertical register and provide torque anchorage allowing the clamping screw threaded rod to be rotated relative to the body which is anchored against torque for that purpose, and the closure disc is jack-screwed up against the end of the nozzle of the jet pump unit. Thus, with a string and a ring the operator can, through the narrow gap and the considerable distance, close off each jet pump nozzle of the reactor and avoid the necessity for taking the reactor out of service and removing the fuel bundles.

BRIEF DESCRIPTION OF THE DRAWINGS

FIG. 1 is a vertical schematic section through a reactor showing the jet pumps in position within the shell and illustrating also the difficulty of access to the jet pumps located in the lower part of the shell;

FIG. 1a is a vertical section through the removable top cover or dome which may be released and lifted to permit such access as there is to the jet pumps;

FIG. 3 is a view similar to that of FIG. 2 but showing the tool of the present invention applied to the nozzle and shutting off the flow therethrough;

FIG. 4 is a detailed sectional view on the line 4—4 of FIG. 3 illustrating the application of the suspension hook of the tool applied to the top of the nozzle fitting;

FIG. 5 is a detailed section taken on the line 5—5 of FIG. 3 illustrating the spacer bracket on the lower part of the body of the tool;

FIG. 6 is a section taken on the line 6—6 of FIG. 3 illustrating the method of swinging the closure up against the outlet of the jet nozzle; and FIG. 7 is a view taken on the line 7—7 of FIG. 3 showing the bottom of the closure pad.

DESCRIPTION OF THE PREFERRED EMBODIMENT

Figure 2:
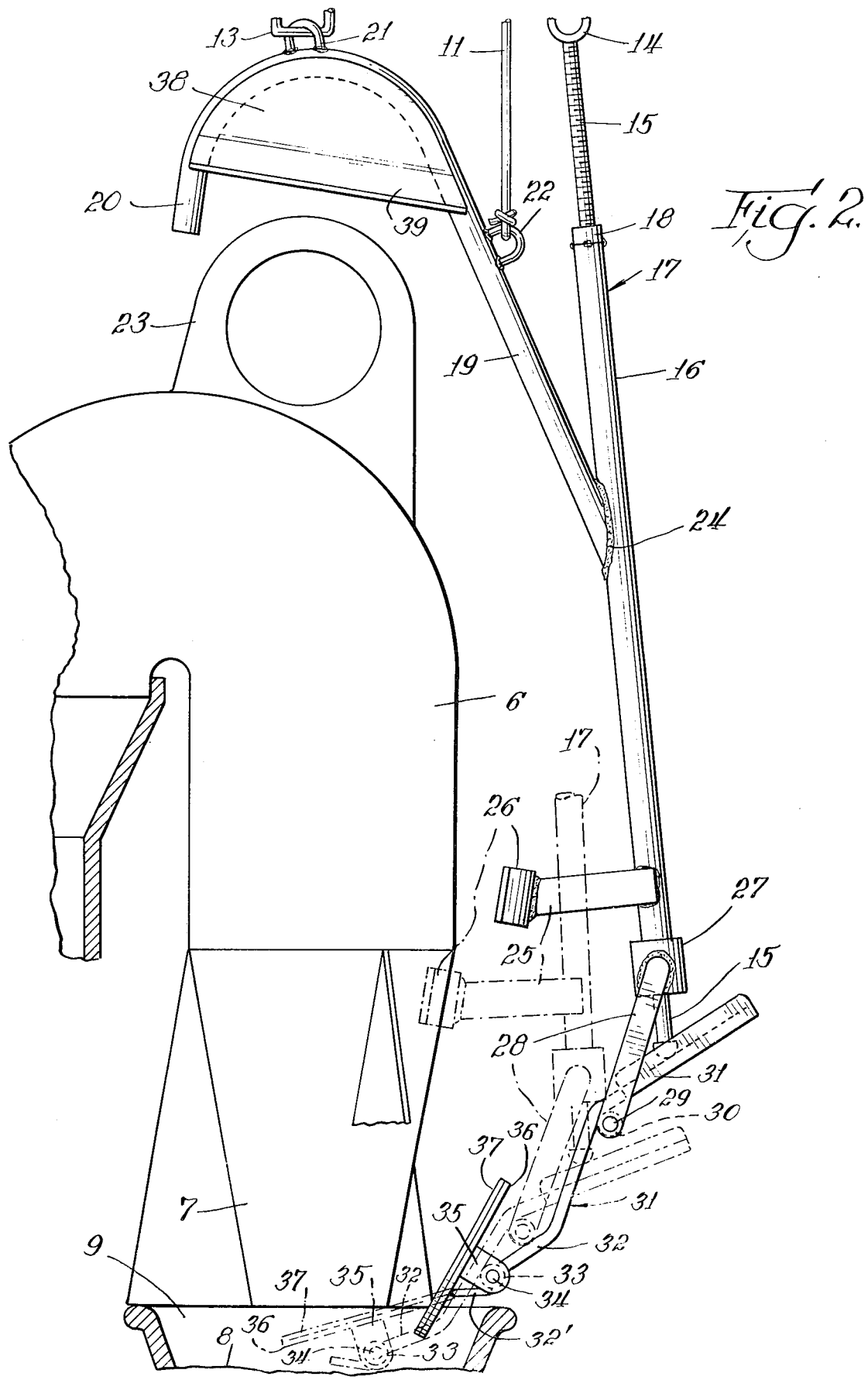
FIG. 2 is a fragmentary side elevational view of a nozzle and diffuser tube of a jet pump with the closure tool of my invention showing its method of application and operation in shutting off the discharge thru the nozzle.

The reactor jet pump plugs of the present invention are inserted inside the reactor shell by the technician operating at a remote position to apply the plugs to the jet pumps to close the nozzles thereof in order to allow work to be done on the reactor or on the circulation piping and equipment without unloading the fuel from the reactor and draining it.

Referring to FIGS. 1 and 1a, the reactor shell 1 is seated on a foundation 2 in which is contained mechanism for manipulating the control rods in the reactor core. A water circulating system 4 includes a recirculating pump 5, two of which circuits and pumps are employed in the reactor. The cylindrical shell 1 is rounded at top and bottom as shown in FIG. 1. The upper rounded hemispherical end section of the shell, shown in dotted lines in FIG. 1, is unbolted and removed as shown in FIG. 1a to enable the tool of the present invention to be brought into play to plug off the vertical branch pipes for operating the jet pipes 6, 6, which pipes constitute branches from the delivery side of the circulating pump 5.

In case it is necessary to open up the circulating pipe system 4 and to drain the same, the jet pumps become inactive as such, but become outlets for draining water out of the enclosure. It is therefore desirable to close off the jet pump nozzles 7, 7 to allow work to be done on the reactor recirculation piping and equipment without unloading the fuel bundles from the reactor and draining the reactor.

Referring now to FIGS. 2 and 3 for an illustration of the jet pump construction, the jet pump is a fluid ejector consisting essentially of a nozzle 7 of conical shape. The nozzle 7 is directed axially into the throat 8 of the flared inlet 9 thereby inducing additional flow down through the delivery tubes 10, 10 which deliver the augmented flow to the lower end of the casing 1.

The normal water level of the operating reactor is maintained at substantially the top of the cylindrical shell as shown in full lines in FIG. 1.

There is no provision in the installation of the reactor for any means for shutting off the jet pumps and there is no access to them except down through the annular gap along the side wall of the reactor shell. The means for shutting off the jet pumps involves the so-called jet pump unit plugs illustrated in detail in FIGS. 2–7. The implements by which the jet pump unit is brought into operation consists of a ¼ inch nylon cord 11 and the operating rod 12 which has a hook 13, at the lower end thereof, for engaging the eye 14 of the threaded operating rod 15 which rod extends through the cylindrical body 16 of the plug applying unit 17.

The plug applying unit 17 comprises the tubular body portion 16 at the upper end of which there is welded a threaded nut 18 thereby fixed on the upper end of the tubular frame or body member 16.

To the side of the tube 17, as shown in FIG. 3, there is attached, by welding, an arm 19 the upper end of which is curved into the form of a downwardly facing hook 20. To the uppermost portion of the upwardly convey hook 20 there is fixed a suspending eye 21 with which the hook 13 of the operating rod 12 may be connected for establishing the initial position of the unit in respect of the jet pump. To aid placement of the suspending hook 20 on the lug member 20, which is a perforated lug or eye member constituting a part of the original equipment of the jet pump, the bowed-out side bars 38 are welded at their ends to the opposite sides of the hook 20. The outward bow of the side plates causes them to act like a flattened funnel turned upside down and assists in the registering and turning of the hook 20 into the same plane as the lug 23.

The hook member 20 has its longer arm 19 disposed diagonally downwardly as viewed in FIGS. 2 and 3 and welded at 24 to the main tubular cylindrical body 16 of the plug applying unit 17.

At its lower end the cylindrical body member 16 carries a bracket 25 (see FIGS. 3 and 5) which is welded to the side of the tube 16 adjacent its lower end and extends at substantially right angles to the side tube 16 and it bears a saddle member 26 at its end to engage the side wall of the conical downwardly extending portion of the jet nozzle member 6 of the jet pump. A cylindrical collar 27 is welded onto the lower end of the cylindrical body 16, and a pair of bracket arms 28, 28 are attached by welding to the sides of the collar 27.

The arms 28, 28 at their lower ends are tied together by a rod 29 which extends through a lug 30 which forms a transverse tubular bearing and which is mounted on and welded to the lower side of the closure-applying lever 31 which bears at its lower and longer end 32 a bearing sleeve 33 which embraces a bearing pin 34 which is attached on the end of the arm 32. The bearing pin 34 has its ends attached to the arms of the U-shaped bracket 35, the bottom of the U-shaped bracket being applied to and fixed to the bottom of the disc 36. The disc 36 has a facing 37 of resilient gasket material to bear against and close the end of the jet pump nozzle 7. The bearing sleeve 33 which is mounted on the end of the shutoff lever 32 has affixed thereto a finger 37 the purpose of which is to limit the angular freedom in counterclockwise direction in FIGS. 2 and 3 to assure the angular position of the said closure disc 37 when the tool is being applied to the lower end of the nozzle and it must be positioned in such a manner as to pass between the inside of the throat 8 and the outside of the nozzle 7 as indicated in FIG. 2. The lever 31, 32 being pivoted on the hinge pin 29 is unbalanced in the counterclockwise direction in FIG. 3 so that when the rod 16 is raised from the position shown in FIG. 3 to the position shown in FIG. 2, the lever 31, 32 and the valve closure disc 37 will, when the tool is suspended from the eye 14 on the upper end of the threaded portion 15 of the longitudinal rod 16, assume the position shown in full lines in FIG. 2 and when fully lowered and the operating threaded rod 15 is screwed down to the limit, the parts will assume the position shown in FIGS. 3–7 inclusive.

The supplemental tools and manipulation required to effect the closure shown in FIG. 3 include the following.

Referring to FIG. 1, it will be seen that the jet pump units are located in the lower part of the shell or casing of the reactor. When it is desired to stop the pump circulation for the purpose of repairs to the external cooling water system, the contained body of water which normally fills the reactor vessel up to the level or approximately the joint between the main body parts of the shell, shown in full lines in FIG. 1, and the cover member or closure shown in FIG. 1a. The only possible way of shutting off the jet pumps, as shown in FIG. 1, is by reaching down along the side wall of the container in vertical register with the said jet pumps and somehow plugging the nozzles of the jet pumps, otherwise, with the head of liquid above the nozzles, the water content of the reactor shell would flow out in reverse direction through the nozzles and escape through the open circulating system which is at that time under repair. The operator must work from the upper level at about the level of line 38 shown in FIG. 1. With the shut-off tool, shown in detail in FIGS. 2–7, he is enabled to do this job of closing off the jet pumps. They may be opened by steps above described — performed in reverse order.

Operation of the Jet Pump Closure Tool

There are two operations involved in shutting off the jet pumps. The first step is the job of placing the closure tool in position for its operation to close off the nozzle of each jet pump in series, and the second operation is the actual performance of closure of the nozzles of the jet pumps to take them out of operation.

Application of the Closing Tool to the Jet Pumps

With the parts of the closure tool in their positions relative to each other, shown in FIG. 2 in full lines, the operator suspends the tool on a nylon rope 11 attached to the suspension eye 22 and with the threaded stem 15 raised to its uppermost position, as shown in FIG. 2, the tool is lowered in the space between the shell of the reactor and the contained parts. Simultaneously, the rod 12 with the hook 13 is hooked into the bail, or eye, 21 to control the angular position in a horizontal plane of the tool which is lowered on the cord 11. The rod 12, with the hook 13, may be utilized to control angularity. Assuming that the tool is lowered by the woven nylon cord 11 to a position approximately at the full line position shown in FIG. 2, or slightly above the same, the direction in a horizontal plane which the tool must occupy will be determined by the use of the rod or pole 12, the hook of which is extended through the eye 14, and this rod with its connection to the hanger hook 19 may serve to register the pocket formed by the hook 20 and the side bar 38 on the hook 20. The suspension eye 22 which is mounted on the hanger 19 lies vertically in register with the center of gravity of the tool when the tool is in the position shown in FIG. 2.

An underwater television equipment comprising a viewer and a display screen are employed to enable the operator to see the position of the tool and to guide it as required. When the parts are in the position shown in FIG. 2 and the tool is suspended on the cord 11 from the eye 22, gravity will hold the parts in the position shown in FIG. 2. Any tendency to twist may be overcome by stick 12 and hook 13. In this position the threaded rod 15 will be substantially at the top of its traverse, and the parts of the closure members supported and operated by the main frame member 16 will permit the tool to be moved to the right in the plane of the paper of drawing FIG. 2 whereby the parts will be in the position shown in full lines in FIG. 2, the tool being suspended on the cord 11 and guided to the extent desired by the rod 12 and its hook 13 through the eye 14.

The position of the closure disc 37 carried on its hinge 34 on the lower end of the bracket arm 31, 32 is shown in full lines in FIG. 2, suspended on the cord 11. The weight of the tool, suspended on the ring 22, will swing the tool in the plane of the paper as shown in FIG. 2 around the attachment of the cord 11 to the eye 22 to bring the closure disc 37 from the full line position shown in FIG. 2 to the dotted line position in FIG. 2 and then to the full line position shown in FIG. 3. With the three suspension points available, the hook 13 may be used to swing the tool in the plane of the paper of FIG. 3 through either the eye 14 or the eye 21 — whichever is needed — to tuck the end of the lever 32 with its disc closure member 37 below the nozzle 7. Then the tool has been brought into the position of disposing the closure disc 37 against the nozzle 7, the tool may be operated to clamp the closure against the nozzle. This is done by inserting the hook 13 of rod 12 into the eye 14 and turning the rod 16 on its threads 15 by the connected operating rod 12 and its hook 13 in the eye 14 of the threaded rod 15.

When the parts are in the position shown in full lines in FIG. 2 and the line is lowered, the tool being suspended on the line 11, the lower end of the tool with the closure disc 36, 37 enters the flared inlet 9 and the inclined arcuate saddle member 26 engages the conical wall of the nozzle member 7 and guides the valve disc 37 below the nozzle opening. While the tool is thus being lowered, the flared or bowed edges of the side plates 38 (see FIGS. 2 and 4) pass down over the flat eye member 23 which projects up from the top of the U-turn of the jet pipe 6 (see FIGS. 2 and 3). At the same time the tool is lowered so as to clear the lower end of the nozzle 7 and to enter the eye 23 between the guiding bars 32 which are on opposite sides of the main suspension hook member 20. The sides of these bars 38 may preferably be bowed outwardly at the center and flared at their lower edges to assist in registering the eye 28 in the embrace of the hook 20 as shown in FIG. 3.

The final closure of the nozzle 7 by the disc 36, 37 is effected as shown in FIG. 3 by introduction of the hook 13 into the eye 14 of the threaded rod 15 which is then turned on its axis to push down on the arm 31 of the lever 32 until the closure disc 36, 37 engages the lower end of the conical nozzle 7 and shuts off the flow of water through the nozzle. The short arm 31 of the lever 32 is provided with flange members on the sides as shown at 39 in FIGS. 3 and 7 to stiffen the same and to keep the end of the short arm of lever 32 in register with the lower end of rod 16.

Release and removal of these jet pump plugs will be apparent from the above description and the drawings. It consists briefly in relaxing the holding pressure applied to the jet pump nozzle by the closure disc and its connected arm at the lower end, and raising the hook and bracket 20 and 19 by backing off the threaded rod 15. Since the period of service of the above described jet pump plugs is relatively short, the nylon line 11 may, during the repair period, remain attached. By the use of these jet pump plugs, there can be gained a great saving in the down time which would otherwise be required that indicates the value of the invention.

The invention claimed is:

1. A tool of the class described for shutting off a boiling water reactor circulating jet pump which has a flat upwardly extending lug, comprising a vertically disposed tubular frame member (16) having a threaded longitudinal bore, an included longitudinally extending threaded actuating rod (15) threaded through said frame member and being rotatable on said threads to extend or retract the lower end of said rod (15), a diagonally upwardly and laterally extending hook shaped suspension arm member (19) fixedly attached at its lower end to the upper part of the frame member (16) and having a downwardly open hooked portion (19) at its upper end, side bars on said hooked portion (19) adapted to embrace the flat upwardly extending lug (23) of a jet nozzle member 6, a laterally projecting spacing bracket (25) on the side of the tubular frame in alignment with the aforesaid hook shaped suspension portion, said threaded rod (15) having a manipulating eye at its upper end, laterally and downwardly extending diagonal bracket arms (28) fixed on opposite sides of the lower end of the frame member (16), a swinging closure lever (31) hinged intermediate its ends on and between the lower ends of said bracket arms (28), said hinged closure member comprising a lever 31, one arm of which is engageable by said threaded actuating rod (15) and an upwardly facing closure pad (37) swiveled on the upper side of the other arm of the lever (31) for engaging a downwardly directed open jet pump nozzle member, the upper end portion of which member is adapted to be engaged by said hooked portion (20) of the suspension arm (19).

2. A tool for closing off the nozzle of a reactor jet pump of known construction characterized by an inverted J-shaped jet pump nozzle member, the shorter leg of which member is adapted to be connected to and carried by a pressure fluid conveying supply pipe, the longer leg of which terminates in a downwardly directed nozzle outlet, a diffusion tube having an open annular entry end surrounding said nozzle and spaced therefrom, said inverted J-shaped nozzle member having a flat vertical upwardly extending ring-shaped ear disposed in the plane of the nozzle member, said tool comprising a frame consisting of a vertically extending tubular body member adapted to be vertically disposed substantially parallel to said nozzle, an operating rod disposed in said tubular body, said rod and a part of the body having cooperating screw threads, said operating rod having a ring at its upper end for suspending the tool and for rotating said rod on the threads and a lever bearing at its one end a hinged closure plate actuatable by said operating rod to swing said lever to apply the closure plate to said nozzle.

3. A tool for use in closing off a jet pump nozzle of a jet pump of a reactor which jet pump comprises an inverted J-shaped conduit disposed in a vertical plane, the shorter leg of which conduit is adapted to be connected in vertical alignment with a pressure fluid conveying pipe, and having on its top a flat ring shaped lifting ear disposed in a vertical plane and being attached at its bottom edge to and projecting vertically from the top of the said inverted J-shaped conduit, said ear lying in the axial vertical plane of said inverted J-shaped conduit, said jet pump further comprising a vertically disposed and upwardly and outwardly flared receiving tube axially aligned with said longer leg of the inverted J-shaped conduit and having vertically disposed at its upper end adjacent said longer leg of the J-shaped conduit, connected by a plurality of circumferentially spaced vertical webs, the combination with a shut-off tool which tool comprises a vertically disposed main frame member which is provided with internal screw threads, an actuating rod having external screw threads and disposed in and extending through said frame member, said rod being rotatable on said threads for longitudinal movement of the rod, a diagonally upwardly extending suspension arm having a downwardly open arcuate hook at its upper end, said hook being shrouded at its side to form a pocket for receiving and embracing the vertically disposed lug on the upper end of said inverted J-shaped conduit, said tool suspension arm being connected at its lower end rigidly to the side of the frame member and extending diagonally upward from a point on said longitudinal frame member above the center of gravity of the tool, a hook for hooking over the lifting eye of the inverted J-shaped conduit of the jet pump, said frame member having adjacent its lower end an aligning bracket for engaging the downwardly extending body of the jet nozzle to align the tool vertically along the tubular body of the nozzle, the lower end of the frame having a pair of diagonally downwardly extending bracket arms rigidly secured horizontally on the opposite sides of the frame, a closure lever hinged on and between said bracket arms to swing in a vertical plane and having a thrust receiving pad at its adjacent end adapted to be engaged by downwardly endwise movement of said actuating rod in said frame and a hinged closure lever having a closure pad on its remote end substantially in alignment with the aforesaid suspension arm hook for closing off the downwardly directed jet nozzle.

4. The tool of claim 3 wherein the lower end of the closure lever, when it is in its retracted substantially vertical position, is adapted to enter the flared open end of the jet pump diffuser before the aforesaid hook, which is mounted on the frame, sinks down over the lifting eye of the jet nozzle.

5. The tool of claim 3 wherein a lowering cable is detachably connected to the hook member above the center of gravity of the tool whereby the main frame member of the tool is suspended in substantially vertical position and the nozzle closure arm passes the thrust pad edgewise down between the nozzle and the induction tube.

6. The tool of claim 3 wherein a suspension eye is mounted on the frame which permits the tool when suspended on said eye to register the hook of the frame member.

7. A tool for shutting off a jet pump, which jet pump comprises an inverted U-shaped jet nozzle member having a flat ring-like ear at the top of the inverted U, and having a conical downward directed nozzle, a choke tube having a flared entry and aligned with the nozzle by spaced radial wings on the nozzle resting on the open end walls of said choke tube, said tool comprising a vertically extending main tubular frame member having attached at one side thereof, a diagonally upwardly extending hook frame the hook thereof facing downwardly, substantially horizontal bars attached to opposite sides of said hook to form a pocket opening downwardly and adapted to be lowered upon the aforesaid lug on the jet member, said tubular main frame member bearing a laterally spacing member adjacent its lower end for engaging the side of the jet nozzle member, said tubular main frame member having a bracket base at its lower end, bracket arms rigidly attached to said base and extending diagonally downwardly in planes parallel to the plane of said spacing member, a closure applying lever of the first class pivoted intermediate its ends on the lower ends of said bracket arms.

8. The tool of claim 7 wherein one arm of said first class closure applying lever bears a disc-shaped closure which is adapted to be applied to the jet nozzle opening of said ejector to close said opening.

9. The tool of claim 8 wherein the tool has a suspension eye on the hook frame which brings the tool into vertical position to bring the hook frame into alignment with the upwardly extending lug on the inverted U-shaped nozzle member and the edge of the closure disc into alignment with the space between the lower end of the nozzle and the upper edge of the induction tube member.

10. The tool of claim 9 wherein the tool may be lowered by a flexible tension element to register the nozzle closing disc with the jet pump nozzle and the pocket of the tool is lowered over the lug on the top of the jet nozzle.

* * * * *